United States Patent [19]

Park

[11] Patent Number: 5,796,529
[45] Date of Patent: Aug. 18, 1998

[54] FAST PHOTOGRAPHIC LENS SYSTEM

[75] Inventor: Cheon-ho Park, Kyungki-do, Rep. of Korea

[73] Assignee: Samsung Aerospace Industries, Ltd., Kyungsangnam-Do, Rep. of Korea

[21] Appl. No.: 720,135

[22] Filed: Sep. 27, 1996

[30] Foreign Application Priority Data

Sep. 29, 1995 [KR] Rep. of Korea ............... 1995-33026

[51] Int. Cl.$^6$ .................... G02B 9/62; G02B 13/04
[52] U.S. Cl. .................... 359/756; 359/759; 359/751
[58] Field of Search .................... 359/756, 757, 359/759, 760, 752, 713

[56] References Cited

U.S. PATENT DOCUMENTS

| | | | |
|---|---|---|---|
| 3,738,736 | 6/1973 | Shimizu | 359/760 |
| 3,743,387 | 7/1973 | Nakagawa | 359/760 |
| 3,851,953 | 12/1974 | Nakagawa | 359/760 |
| 3,938,884 | 2/1976 | Nakagawa | 359/760 |
| 3,984,155 | 10/1976 | Nakagawa | 359/760 |
| 4,094,588 | 6/1978 | Nakagawa | 359/760 |
| 4,099,843 | 7/1978 | Imai | 359/760 |
| 4,110,007 | 8/1978 | Ikeda | 359/760 |
| 4,182,550 | 1/1980 | Yamaguchi | 359/760 |
| 4,247,171 | 1/1981 | Tsuji | 359/760 |
| 4,364,643 | 12/1982 | Momiyama | 359/760 |
| 4,466,710 | 8/1984 | Kato et al. | 359/760 |
| 4,553,823 | 11/1985 | Kato et al. | 359/760 |

*Primary Examiner*—Frank G. Font
*Assistant Examiner*—Michael P. Stafiro
*Attorney, Agent, or Firm*—Finnegan, Henderson, Farabow, Garrett & Dunner, L.L.P.

[57] ABSTRACT

A fast photographic lens system comprises a first lens having a positive refractive power, a convex-shaped outer face and a flat inner face; a second lens having a positive refractive power, a convex-shaped outer face and a concave-shaped inner face; a third lens having a negative refractive power, a slightly convex-shaped outer face, and a concave-shaped inner face; a fourth lens having a negative refractive power and a concave-shaped inner face; a fifth lens, joined with the fourth lens, and having a positive refractive power, a relatively flat inner face and a convex-shaped outer face; a sixth lens having a positive refractive power, a slightly concave-shaped inner face and a convex-shaped outer face; and a seventh lens, having both convex-shaped inner and outer faces.

3 Claims, 2 Drawing Sheets

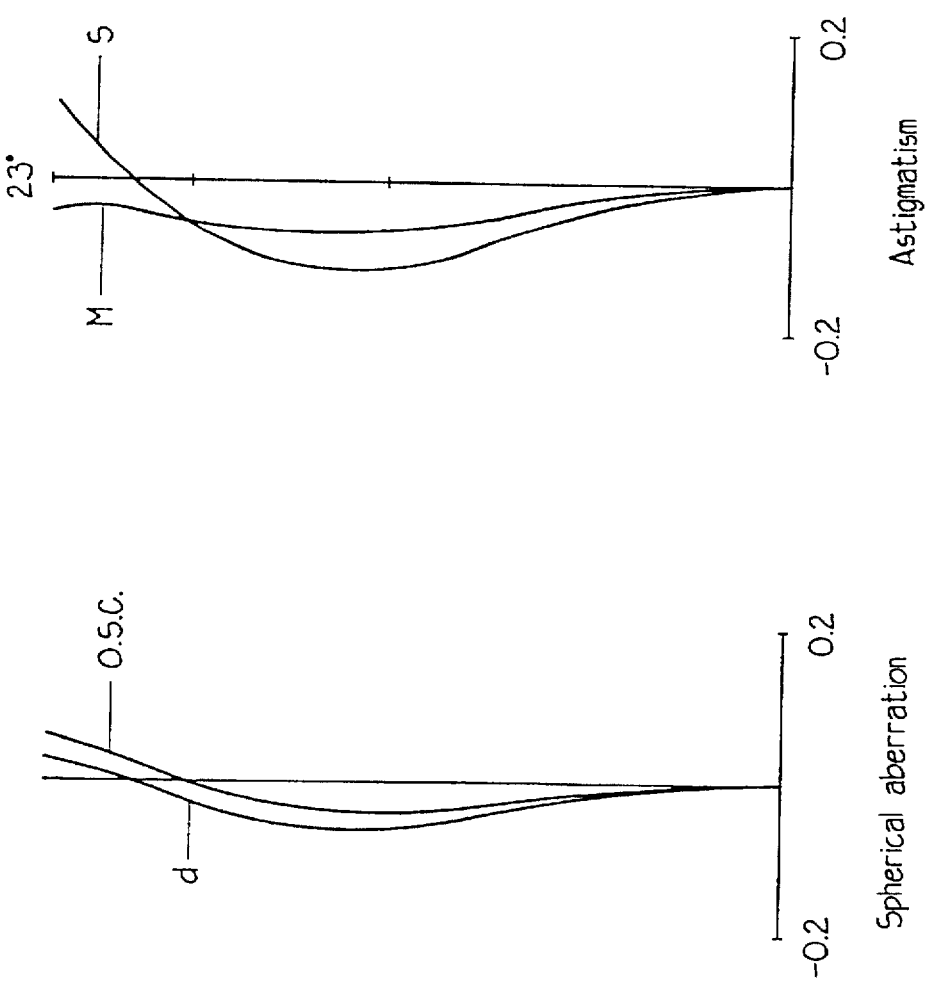
Fig. 4 Distortion
Fig. 3 Astigmatism
Fig. 2 Spherical aberration

FAST PHOTOGRAPHIC LENS SYSTEM

BACKGROUND OF THE INVENTION

The present invention relates generally to a fast photographic lens system, and more particularly, to a fast photographic lens system used in a single lens reflex camera, the lens system comprising a plurality of gauss-type lenses having a high refractive index, wherein the total length of a lens system is small and spherical and chromatic aberrations are eliminated.

Generally, photographic lenses are designed so that the aberration correction of infinite objects is of central importance. Emphasis is also placed on having lenses which have a variety of uses and which are capable of focusing short distance objects. An ideal lens is one that can focus infinite and short distance objects, simultaneously, with equally high competence.

Recently, technology for gauss-type standard photographic lenses has undergone a marked development. However, gauss-type lenses were once only made from material having a high refractive index. Furthermore, when designing gauss-type standard photographic lenses with good contrast, problems arise in enlarging the positive angle view of the chromatic flare and in correcting spherical and chromatic aberrations. To solve the above problems, the prior art uses material for lenses with a large ABBE number (a number indicating the light dispersion value, wherein the smaller the number the larger the light dispersion). In doing so, however, only a gauss-type lens with a low refractive index can be used in a lens having positive refractive power. As a result, the spherical aberration is increased and the entire length of the lens is enlarged.

SUMMARY OF THE INVENTION

The present invention has been made in an effort to solve the above problems. It is an object of the present invention to provide a fast photographic lens system that uses a lens material with a high refractive index, that minimizes the entire length of a lens system, that corrects spherical and chromatic aberrations, and that is highly effective and has a high contrast.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

To achieve the above object and in accordance with the purpose of the invention, as embodied and broadly described herein, the invention comprises a fast photographic lens system, comprising: a first lens having a positive refractive power and a convex-shaped outer face; a second lens having a positive refractive power and a convex-shaped outer face; a third lens having a negative refractive power and a convex-shaped outer face; a fourth lens, having a negative refractive power and a concave-shaped inner face; a fifth lens joined to the fourth lens and having a positive refractive power and a convex-shaped outer face; a sixth lens having a positive refractive power and a convex-shaped outer face; and a seventh lens having convex-shaped inner and outer faces.

The fast photographic lens system of the present invention further satisfies the following conditions:

$$0.29 \times f < R6 < 0.35 \times f \tag{1}$$

$$0.30 \times f < |R7| < 0.35 \times f, \; R7 < 0 \tag{2}$$

$$0.75 \times f < R1 < 0.80 \times f \tag{3}$$

$$0.50 \times f < |R9| < 0.60 \times f, \; R9 < 0 \tag{4}$$

$$0.78 \times f < R4 < 0.82 \times f \tag{5}$$

$$0.78 \times f < L < 0.82 \times f \tag{6}$$

$$0.25 \times f < d6 < 0.30 \times f \tag{7}$$

Where f is the focal point distance of the whole lens system, R6 is the curvature radius of the inner face of the third lens, R7 is the curvature radius of the inner face of the fourth lens, R1 is the curvature radius of the outer face of the first lens, R9 is the curvature radius of the outer face of the fifth lens, R4 is the curvature radius of an inner face of the second lens, L is the thickness of the entire lens system, and d6 is the length from the inner face of the third lens to the inner face of the fourth lens.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate one embodiment of the invention and together with the description, serve to explain the principles of the invention. In the drawings:

FIG. 2 is a graph showing a spherical aberration of the fast photographic lens of FIG. 1;

FIG. 3 is a graph showing an astigmatism of the fast photographic lens of FIG. 1; and FIG. 4 is a graph showing a distortion of the fast photographic lens of FIG. 1.

DETAILED DESCRIPTION OF THE PREFERRED EMBODIMENT

Figure 1:
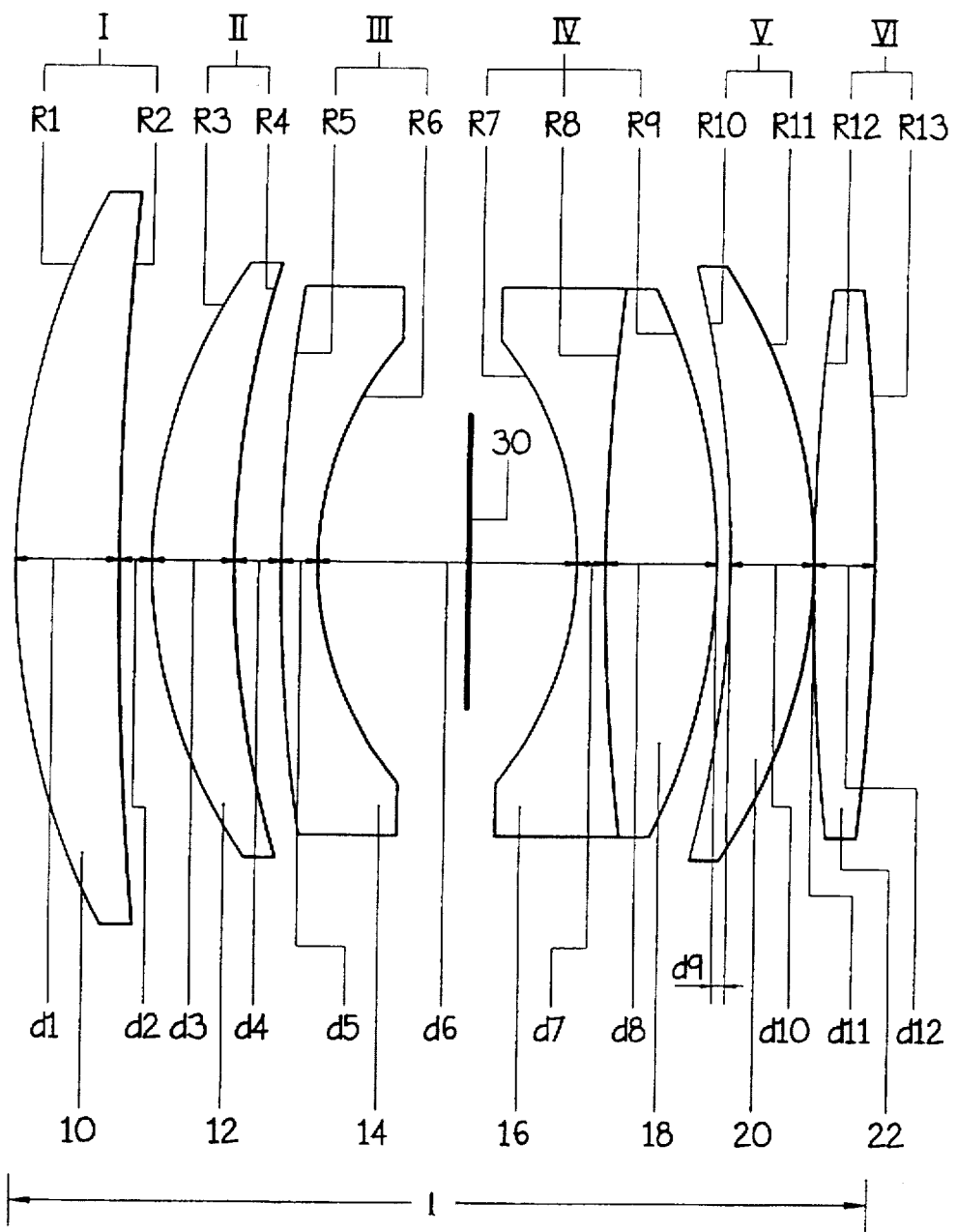
FIG. 1 is a schematic diagram showing a lens arrangement of a fast photographic lens in accordance with a preferred embodiment of the present invention.

Reference will now be made in detail to the present preferred embodiment of the present invention, an example of which is illustrated in the accompanying drawings.

A fast photographic lens system in accordance with a preferred embodiment of the present invention comprises a first lens group (I) including a first lens 10 having a positive refractive power; a second lens group (II) including a second lens 12 having a positive refractive power; a third lens group (III) including a third lens 14 having a negative refractive power; a fourth lens group (IV) including a fourth lens 16 having a negative refractive power, and a fifth lens 18 joined with the fourth lens; a fifth lens group (V) including a sixth lens 20 having a positive refractive power; and a sixth lens group (VI) including a seventh lens 22 having convex-shaped inner and outer surfaces.

The first lens 10 has a convex-shaped outer face with a curvature radius R1 and an inner face with a curvature radius R2; the second lens 12 has a convex-shaped outer face with a curvature radius R3 and a concave-shaped inner face with a curvature radius R4; the third lens 14 has a slightly convex-shaped outer face with a curvature radius R5 and a concave-shaped inner face with a curvature radius R6; the fourth lens 16 has a concave-shaped inner face with a curvature radius R7 and a slightly concave-shaped outer face; the fifth lens 18 has a slightly concave-shaped inner face with a curvature radius R8 and which is joined with the outer face of the fourth lens 16 and which has a convex-shaped outer face with a convex curvature radius R9; the sixth lens 20 has a concave-shaped inner face with a curvature radius R10 and a convex-shaped outer face with a curvature radius R11; and the seventh lens has a convex-shaped inner face with a curvature radius R12 and a convex-shaped outer face with a curvature radius R13.

In the present invention, only the fourth lens group IV has more than one lens and the remaining lens groups I, II, III, V, VI have only one lens. However, the present invention is not limited to this composition and as long as each lens group satisfies the special characteristics, any or all of the lens groups can be realized through more than one lens.

The following is a listing of the preferred conditions which the fast photographic lens in accordance with the preferred embodiment of the present invention must meet:

$$0.29 \times f < R6 < 0.35 \times f \quad (1)$$

$$0.30 \times f < |R7| < 0.35 \times f, \; R7 < 0 \quad (2)$$

$$0.75 \times f < R1 < 0.80 \times f \quad (3)$$

$$0.50 \times f < |R9| < 0.60 \times f, \; R9 < 0 \quad (4)$$

$$0.78 \times f < R4 < 0.82 \times f \quad (5)$$

$$0.78 \times f < L < 0.82 \times f \quad (6)$$

$$0.25 \times f < d6 < 0.30 \times f \quad (7)$$

Where f is the focal point distance of the whole lens system, L is the thickness of the whole lens system, and d6 is the length from the inner face of the third lens 14 to the inner face of the fourth lens 16.

The above conditions are related to the concave and convergent bundle of rays of the entire system. The conditions provide strong curvature to each of lens faces R6, R7, R1, and R9, which act as the most important parts, reduce the Petzval sum, and provide adequate correction of the astigmatism and the spherical aberration of the lens system.

Conditions (1) and (2) are preferably for strengthening lens faces R6 and R7 as much as possible, and for reducing the Petzval sum. Conditions (3) and (4) are preferably for strengthening R1 and R9 and for solving the problems of spherical aberration of over-correction and chromatic flare of the picture center portion, both caused by the reduction of the Petzval sum. Furthermore, if R9 is strengthened, sound distortion may be corrected. If the upper limit value of the conditions (1) and (2) is exceeded, it becomes more difficult to reduce the Petzval sum, and if the lower limit values of these conditions are not met, it is difficult to remove the chromatic flare formed in the picture center portion. Conditions (3) and (4) are also effective for reducing the Petzval sum. If the upper and lower limit values of conditional formula (3) are not met, it is difficult to correct the spherical aberration of the lens system.

Condition (5) is necessary for reducing sagittal ray chromatic flare caused by conditions (1) and (2). If the lower limit value of condition (5) is not satisfied, the aberration of the ray passing the circumference of the lens system increases. However, if the upper limit value of condition (5) is exceeded, astigmatism increases. Conditions (6) and (7) reduce the Petzval sum and correct astigmatism more easily than the other conditions. Also, when the upper limit values of conditions (6) and (7) are not met, circumferential light quantity cannot be sufficiently increased, and, as a result, it is difficult to make the lens system compact.

The following table lists the most preferred values of the fast photographic lens according to a preferred embodiment of the present invention. Preferably, the focal point length f is 1.0 mm, the iris value FNo is 1.4, the thickness of the entire lens system I is 0.0816, and the half angle of view W is 230 for the fast photographic lens in accordance with the preferred embodiment of the present invention.

| Curvature radius | Spacing and length (mm) | Refractive index | ABBE number |
|---|---|---|---|
| R1 = 0.77643 | d1 = 0.0921 | n1 = 1.77250 | v1 = 49.62 |
| R2 = 3.43245 | d2 = 0.0266 | | |
| R3 = 0.51701 | d3 = 0.0674 | n2 = 1.80420 | v2 = 46.50 |
| R4 = 0.80561 | d4 = 0.0484 | | |
| R5 = 1.17998 | d5 = 0.0431 | n3 = 1.64769 | v3 = 33.84 |
| R6 = 0.32031 | d6 = 0.2931 | | |
| R7 = −0.58845 | d7 = 0.028 | n4 = 1.75520 | v4 = 27.53 |
| R8 = 1.85414 | d8 = 0.1169 | n5 = 1.78590 | v5 = 43.93 |
| R9 = −0.58845 | d9 = 0.0107 | | |
| R10 = −1.67068 | d10 = 0.0818 | n6 = 1.77250 | v6 = 49.62 |
| R11 = 4.10970 | d11 = 0.0029 | | |
| R12 = 4.10970 | d12 = 0.00540 | n7 = 1.83400 | v7 = 37.4 |
| R13 = −1.84981 | | | |

Where d1, d3, d5, d7, d8, d10, and d12 are the thicknesses of the first through seventh lenses 10–22, respectively; n1–n7 are the refractive indices of the first through seventh lenses 10–22, respectively; and v1–v7 are the ABBE number of the first through seventh lens 10–22, respectively. The aberration characteristics of the fast photographic lens formed with the above values of the preferred embodiment are as shown in FIGS. 2–4.

The present invention according to the preferred embodiment uses gauss-type lenses having a high refractive index, which reduces the total length of the lens system and corrects the spherical and chromatic aberrations. In addition, the aberrations due to infinite and short distance objects are satisfactorily corrected. Finally, the fast photographic lens system has a small optimal image plane displacement, and has high contrast and high capability when a diaphragm 30, disposed between the third lens group III and fourth lens group IV, is opened or contracted.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A fast photographic lens system comprising, from an object side to an image side:

a first lens having a positive refractive power and a face convex to the object side;

a second lens having a positive refractive power and a face convex to the object side;

a third lens having a negative refractive power and a face concave to the image, side;

a fourth lens having a negative refractive power and a face concave to the object side;

a fifth lens joined with said fourth lens and having a positive refractive power and a face convex to the image side;

a sixth lens having a positive refractive power and a face convex to the image side; and a seventh lens having a face convex to the object side and a face convex to the image side, wherein said photographic lens system satisfies the following conditions:

$$0.29 \times f < R6 < 0.35 \times f, \tag{1}$$

$$0.30 \times f < |R7| < 0.35 \times f, \; R7 < 0, \tag{2}$$

$$0.78 \times f < R4 < 0.82 \times f, \tag{3}$$

$$0.75 \times f < R1 < 0.80 \times f, \tag{4}$$

$$0.50 \times f < |R9| < 0.60 \times f, \; R9 < 0, \tag{5}$$

$$0.78 \times f < L < 0.82 \times f, \tag{6}$$

and $$0.25 \times f < d6 < 0.30, \tag{7}$$

where f is a focal point distance of said lens system, R6 is the curvature radius of the concave face of said third lens, R7 is the curvature radius of the concave face of said fourth lens, R4 is the curvature radius of a face of said second lens facing the image side, R1 is the curvature radius of the convex face of said first lens, R9 is the curvature radius of the convex face of said fifth lens, L is the thickness of said lens system, and d6 is the length from the concave face of said third lens to the concave face of said fourth lens.

2. A fast photographic lens system comprising, from an object side to an image side:

- a first lens having a positive refractive power and a face convex to the object side;
- a second lens having a positive refractive power and a face convex to the object side;
- a third lens having a negative refractive power and a face concave to the image side;
- a fourth lens having a negative refractive power and a face concave to the object side;
- a fifth lens joined with said fourth lens and having a positive refractive power and a face convex to the image side;
- a sixth lens having a positive refractive power and a face convex to the image side; and
- a seventh lens having a face convex to the object side and a face convex to the image side, wherein said photographic lens system satisfies the following conditions:

$$0.29 \times f < R6 < 0.35 \times f, \tag{1}$$

$$0.30 \times f < |R7| < 0.35 \times f, \; R7 < 0, \tag{2}$$

$$0.78 \times f < R4 < 0.82 \times f, \tag{3}$$

and $$0.78 \times f < L < 0.82 \times f \tag{4}$$

where f is a focal point distance of said lens system, R6 is the curvature radius of the concave face of said third lens, R7 is the curvature radius of the concave face of said fourth lens, R4 is the curvature radius of a face of said second lens facing the image side, and L is the thickness of said lens system.

3. The fast photographic lens system of claim 2, further satisfying the following conditions:

$$0.75 \times f < R1 < 0.80 \times f, \tag{5}$$

and $$0.50 \times f < |R9| < 0.60 \times f, \; R9 < 0, \tag{6}$$

where R1 is the curvature radius of the convex face of said first lens, and R9 is the curvature radius of the convex face of said fifth lens.

* * * * *

UNITED STATES PATENT AND TRADEMARK OFFICE
CERTIFICATE OF CORRECTION

PATENT NO.    :   5,796,529
DATED         :   August 18, 1998
INVENTOR(S)  :   Cheon-ho PARK It is certified that error appears in the above-indentified patent and that said Letters Patent is hereby corrected as shown below:

Title Page, Item [73], in the Assignee, line 2, "Kyungsangnam-Do" should read --Kyungsangnam-do--.

Claim 1, Col. 4, line 56, after "image", delete ",".

Claim 1, Col. 5, line 3, "$f<R7|<0.35$" should read --$f<|R7|<0.35$--.

Signed and Sealed this

Tenth Day of August, 1999

Attest:

Q. TODD DICKINSON

*Attesting Officer*   *Acting Commissioner of Patents and Trademarks*